(12) United States Patent
Kai et al.

(10) Patent No.: US 6,479,946 B2
(45) Date of Patent: *Nov. 12, 2002

(54) METHOD AND SYSTEM FOR DRIVING HIGH PRESSURE MERCURY DISCHARGE LAMP, AND IMAGE PROJECTOR

(75) Inventors: Makoto Kai, Katano (JP); Makoto Horiuchi, Sakurai (JP); Mamoru Takeda, Soraku-gun (JP); Takeharu Tsutsumi, Katano (JP); Toshiaki Ogura, Hirakata (JP)

(73) Assignee: Matsushita Electric Industrial Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/517,070

(22) Filed: Mar. 1, 2000

(65) Prior Publication Data

US 2002/0101163 A1 Aug. 1, 2002

(30) Foreign Application Priority Data

Mar. 5, 1999 (JP) .............................. 11-058200

(51) Int. Cl.⁷ .............................................. H05B 41/16
(52) U.S. Cl. ...................................... 315/246; 313/639
(58) Field of Search .................................. 315/246, 326, 315/DIG. 2; 313/639, 642, 641, 637, 620; H05B 41/16

(56) References Cited

U.S. PATENT DOCUMENTS

| 4,170,746 | A | * | 10/1979 | Davenport | 315/246 |
|---|---|---|---|---|---|
| 4,605,301 | A | * | 8/1986 | Kira | 355/69 |
| 4,988,918 | A | * | 1/1991 | Mori et al. | 313/641 |
| 5,109,181 | A | * | 4/1992 | Fischer et al. | 313/571 |
| 5,497,049 | A | * | 3/1996 | Fischer | 313/634 |
| 5,668,441 | A | * | 9/1997 | Genz | 313/637 |
| 5,742,123 | A | * | 4/1998 | Nagayama | 313/623 |
| 5,773,937 | A | * | 6/1998 | Miyazaki et al. | 315/246 |
| 5,929,563 | A | * | 7/1999 | Genz | 313/571 |
| 5,965,984 | A | * | 10/1999 | Horiuchi et al. | 313/637 |
| 5,986,402 | A | * | 11/1999 | Narita et al. | 313/620 |
| 6,060,830 | A | * | 5/2000 | Sugitani et al. | 313/639 |
| 6,181,064 | B1 | * | 1/2001 | Narita | 313/623 |
| 6,232,719 | B1 | * | 5/2001 | Kaneko et al. | 313/625 |
| 6,271,628 | B1 | * | 8/2001 | Sugitani et al. | 313/637 |

FOREIGN PATENT DOCUMENTS

| JP | 2-148561 | * | 6/1990 | H01J/61/88 |
|---|---|---|---|---|
| JP | 2-915385 | * | 7/1999 | H01J/61/88 |

* cited by examiner

Primary Examiner—Don Wong
Assistant Examiner—Trinh Vo Dinh
(74) Attorney, Agent, or Firm—Parkhurst & Wendel, L.L.P.

(57) ABSTRACT

An image projector has a lamp unit 23 having a high-pressure mercury vapor discharge lamp 21 and a parabolic mirror 22. To the high-pressure mercury vapor discharge lamp 21, a driving system 24 applies an alternating voltage such that wandering of a cathode luminescent spot generated in the vicinity of a tip of each of the discharge electrodes of the high-pressure mercury vapor discharge lamp 21 is suppressed, the frequency being within the range of 20–42 kHz. This construction allows to prevent flicker in a projected image of a liquid crystal projector and the like, and therefore achieves high quality in the projected image.

10 Claims, 8 Drawing Sheets

High Luminance    Low Luminance

METHOD AND SYSTEM FOR DRIVING HIGH PRESSURE MERCURY DISCHARGE LAMP, AND IMAGE PROJECTOR

BACKGROUND OF THE INVENTION (1) Field of the Invention

The present invention relates to a method and system for driving a high-pressure mercury vapor discharge lamp having a pair of discharge electrodes in an arc tube in which mercury and a rare gas are enclosed. The invention further relates to an image projector employing the lamp.

(2) Description of the Prior Art

High-pressure mercury vapor discharge lamps are known to have a high luminance and therefore utilized for a light source of such optical devices as a liquid crystal projector and the like, with the lamp being positioned so that the light emitting region (arc) is located at the focal point of a reflector mirror such as a parabolic mirror. When such a high-pressure mercury vapor discharge lamp is used as a component in such optical devices, it is necessary that loss of the light emitted from the lamp be minimized so that a high illuminance on the screen is achieved. For this reason, it is preferable that a lamp used for such a light source of liquid crystal projectors have a light emitting region as close as possible to a point source. More specifically, so-called short arc lamps, which have a short light emitting region, are preferable, and in addition, high-pressure mercury vapor discharge lamps are more preferable than metal halide lamps.

In metal halide lamps, the metals enclosed therein as metal halides have a low average excitation energy, and therefore the lamps operate at a relatively low arc temperature. As a result, the light emitting region is not restricted in a region between the electrodes but is spread over a wide region from the center of the arc tube towards the arc tube wall, and accordingly, a point source light is difficult to be achieved by using a metal halide lamp. By contrast, in high-pressure mercury vapor discharge lamps, mercury, which has a high average excitation energy, is enclosed as a fill material thereof. Therefore, in high-pressure mercury vapor discharge lamps, the light emitting region is restricted in a small region, and thus, a light emitting region close to a point source is readily achieved. An example of such a short arc high-pressure mercury vapor discharge lamp is disclosed in Japanese Unexamined Patent Publication No. 2-148561. In this lamp, a mercury vapor pressure during lamp operation is made to be 200 atm. or higher, and continuous radiation components in the visible light range are thus generated by mercury molecule emission. The lamp has a lamp power of 50 W, and exhibits a high luminance and improved color rendering property, and is therefore suitable for the light source of liquid crystal projectors.

As for methods of driving such high-pressure mercury vapor discharge lamps used for a liquid crystal projector and the like, special operating conditions such as an instant restarting and an instant starting of light rays necessary for motor vehicle headlights are not required, and therefore, the driving methods are seldom described in publications. Generally, for driving a high-pressure mercury vapor discharge lamp, alternating voltage having a frequency of several tens to several hundreds hertz is used, since within the frequency range, circuit designing is rendered relatively easy in view of the response speed of large power semiconductor devices.

With a recent trend toward a larger screen size and a higher resolution of liquid crystal projectors, a lamp having a large lamp power that can achieve a higher illuminance on the projection screen has been increasingly demanded. In order to achieve such a lamp, it may be possible to increase a lamp power by raising a mercury vapor pressure during lamp operation and thereby increasing a lamp voltage. However, when rising a mercury vapor pressure is difficult because of the constraint imposed by a wall tube strength against pressure, a lamp current must be increased to increase the lamp power.

In the case in which a high-pressure mercury vapor discharge lamp is operated with a large lamp current, however, there arises a problem that flicker is caused when the lamp is operated by the foregoing conventional driving method with alternating voltage having a frequency of several tens to several hundreds hertz. Flicker is a phenomenon in which an illumination of a projected image is varied from moment to moment. Such flicker induces poor quality in the projected image in liquid crystal projectors and the like employing a high-pressure mercury vapor discharge lamp.

SUMMARY OF THE INVENTION

In view of the foregoing and other drawbacks in prior art, it is an object of the present invention to provide a method and a system for driving a high-pressure mercury vapor discharge lamp for use in a liquid crystal projector and the like, which method and system are free from flicker in the projected image even when the lamp is operated with a large lamp current.

It is another object of the invention to provide an image projector using such a driving system.

In order to achieve the above and other objects, the inventors have studied the cause of such flicker, and as a consequence discovered that wandering of a cathode luminescent spot generated in the vicinity of a tip of each electrode is the cause of the flicker. Referring now to FIG. 1 showing a luminance distribution of the light emitting region between the electrodes 11 and 12, it is noted that a cathode luminescent spot refers to a spot at which the highest luminance is observed (the reference numerals 11a and 12a in FIG. 1) in the vicinity of a point at which electrons are emitted when each of the electrodes 11 and 12 is turned to be a cathode. Now, discussed below is a process in which the wandering of a cathode luminescent spot occurs.

For example, as shown in FIG. 2A, when a negative voltage is applied to the electrode 11 and a positive voltage to the electrode 12, a minute region 11a adjacent to the tip of the electrode 11 is heated to a high temperature and thus turned to be a cathode luminescent spot at which arc is generated by thermionic emission effect. By emission of electrons, such a state of the minute region 11a being a high temperature is further maintained. Thereafter, as shown in FIG. 2B, when the polarity of the applied voltage is reversed, the electrons emitted from the electrode 12 enters a wide region in the tip of the electrode 11. By the entry of the electrons, the energy from the electrons is transferred to the electrode 11, and the wide region of the tip of the electrode 11 is heated as well as the minute region 11a.

Here, in the case of a lamp current being relatively small, although the electrode 11 is heated, the state of the minute region 11a having a higher temperature than the rest of the region is still maintained. As a consequence, when the polarity of the applied voltage is again reversed, the minute region 11a is again turned to be a cathode luminescent spot. Therefore, once a cathode luminescent spot forms at the minute region 11a, the spot does not easily move to another region but stays at a relatively stable position. By contrast, in the case of a lamp current being large, more specifically as shown in FIG. 2C, in the case where a lamp current is so large that the electrode 11 is heated in a wide region 11b in the electrode tip and, viewed on a so-called microscopic level, the electrode 11 is fused and deformed by the heat from moment to moment, the minute region 11a is not necessarily in the state of a higher temperature than that of the rest of the region. In other words, any spot in the wide region adjacent to the tip of the electrode 11 can become a temperature that can result in a cathode luminescent spot. Consequently, it can occur that, when the polarity of the applied voltage is again reversed, another minute region 11c, not the minute region 11a, is turned to be a cathode luminescent spot. That is to say, influenced by convection in the arc tube or surface roughness of the tip of the electrode 11 caused by the heat deformation, a position of a cathode luminescent spot tends to frequently wander in the vicinity of the tip of the electrode 11. Such wandering of the cathode luminescent spot occurs either periodically or non-periodically. In addition, such wandering of the cathode luminescent spot can occur in the electrode 12 as well.

Such wandering of the cathode luminescent spot induces a variation of a luminance distribution in the light emitting region between the electrodes 11 and 12. Note here that, due to the fact that the light emitting region is not a point-source but has a finite volume, a liquid crystal projector and the like is generally configured such that light rays from the various spots in the light emitting region with a certain size are reached and superposed on the projected screen. For this reason, when a luminance distribution of the light emitting region is varied, an illuminance on the projected image is accordingly varied. Such an illuminance variation particularly raises a serious problem in the case of using a short arc lamp. Generally, in a so-called long arc lamp, the shape and position of the arc is regulated by the arc tube wall, and therefore wandering of a cathode luminescent spot is not easily caused. Even if the wandering is caused, undesirable effects on the illuminance variation is not considerable since the area of wandering is small relative to the arc length.

The present inventors have also carried out a study about in what cases a viewer recognizes the illuminance variation as described above as flicker. As a result of the study, it has been found that when a variation of illuminance exceeds ±5% of the immediately preceding illuminance and occurs approximately 60 times/second or less, the variation of illuminance is recognized as flicker, which causes a poor image quality.

In view of the foregoing and other problems in the prior art, the present inventors sought a method for suppressing wandering of a cathode luminescent spot in order to prevent flicker in the projected image, and thus have accomplished the present invention.

The foregoing and other objects are accomplished in accordance with the present invention, by providing a method for driving a high-pressure mercury vapor discharge lamp comprising in an arc tube a pair of discharge electrodes opposed to each other, the lamp wherein at least mercury and a rare gas is enclosed in the arc tube, comprising a step of:
applying an alternating voltage between the discharge electrodes, the alternating voltage having a frequency, for example in the range of 20 kHz to 42 kHz, such that wandering of a cathode luminescent spot generated in the vicinity of a tip of each of the discharge electrodes is suppressed.

The above-described method for driving a high-pressure mercury vapor discharge lamp may be such that:
the high-pressure mercury vapor discharge lamp has an arc length and a rated power such that $$P/d \geq 80 \text{ (W/mm)},$$

where d is the arc length (mm) and P is the rated power (W).

By employing a driving method as described above in which the foregoing alternating voltage is applied to a lamp, wandering of a cathode luminescent spot is suppressed. This makes it possible to prevent flicker in the projected image resulting from the wandering of a cathode luminescent spot in a high-pressure mercury vapor discharge lamp used for a liquid crystal projector and the like.

The present invention also provides a driving system for a high-pressure mercury vapor discharge lamp comprising in an arc tube a pair of electrodes opposed to each other, the lamp wherein at least mercury and a rare gas are enclosed in the arc tube, the driving system operating the lamp by applying an alternating voltage between the discharge electrodes, wherein:
a frequency of the alternating voltage is such that wandering of a cathode luminescent spot generated in the vicinity of a tip of each of the discharge electrodes is suppressed, for example in the range of 20 kHz to 42 kHz, and more specifically, the frequency of the alternating voltage is such that, when an image of an arc adjacent to a tip of each of the discharge electrodes is projected onto a predetermined projection plane, a variation of an illuminance on the projection plane is ±5% or smaller.

The above-described driving system for a high-pressure mercury vapor discharge lamp may be such that:
the high-pressure mercury vapor discharge lamp has an arc length and a rated power such that $$P/d \geq 80 \text{ (W/mm)},$$

where d is the arc length (mm) and P is the rated power (W), or the high-pressure mercury vapor discharge lamp has an arc length of 3 mm or less, or
a temperature of a tip of each of the discharge electrodes is 3000 K or higher in the high-pressure mercury vapor discharge lamp being. operated.

By employing the above-described driving system in which the foregoing alternating voltage is applied to a lamp, wandering of a cathode luminescent spot is suppressed. This makes it possible to prevent flicker in the projected image resulting from the wandering of a cathode luminescent spot in a high-pressure mercury vapor discharge lamp used for a liquid crystal projector and the like.

The above-described driving system for a high-pressure mercury vapor discharge lamp may further comprise:
means for adjusting the frequency of the alternating voltage, and
means for detecting a luminance in the vicinity of a tip of the discharge electrodes,
the driving system wherein:
the means for adjusting the frequency of the alternating voltage controls the frequency of the alternating voltage to be a frequency such that wandering of a cathode luminescent spot generated in the vicinity of a tip of each of the discharge electrodes is suppressed, in response to a result detected by the means for detecting.

By employing the above-described driving system, even in the case where the lamp has varied characteristics or induces a variation due to aging, it is ensured that wandering of a cathode luminescent spot is suppressed and thereby flicker in the projected image is prevented.

The present invention further provides an image projector comprising:
- a high-pressure mercury vapor discharge lamp comprising in an arc tube a pair of discharge electrodes opposed to each other, the lamp wherein at least mercury and a rare gas is enclosed in the arc tube,
- a driving system for operating the high-pressure mercury vapor discharge lamp by applying an alternating voltage between the discharge electrodes, and
- a projection optical system using a light emitted from the high-pressure mercury vapor discharge lamp as a source light to project an image onto a projection screen, the image projector wherein:
- a frequency of the alternating voltage applied to the high-pressure mercury vapor discharge lamp by the driving system is such that wandering of a cathode luminescent spot generated in the vicinity of a tip of each of the discharge electrodes is suppressed.

By the image projector of the above-described configuration, it is made possible to suppress wandering of a cathode luminescent spot and thereby to prevent flicker in the projected image, and thus high quality image can be achieved.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
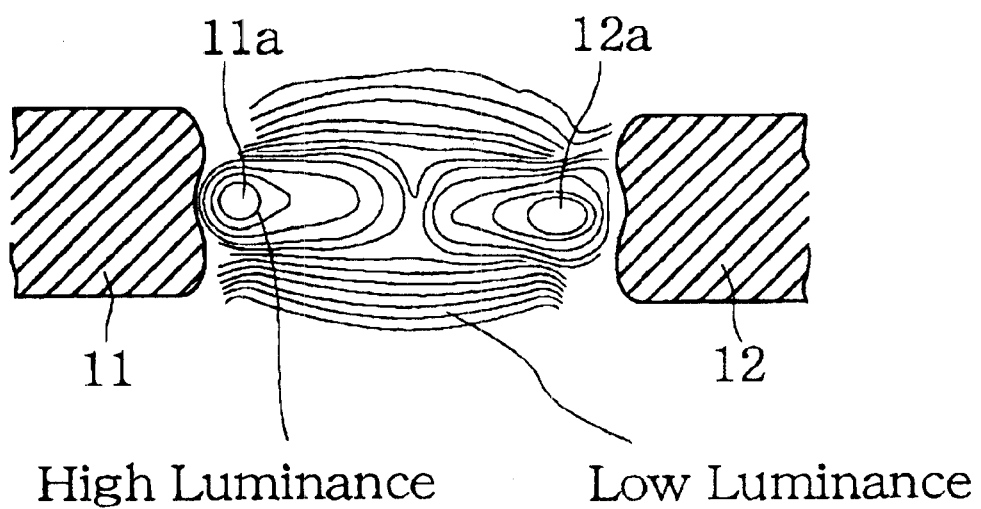
FIG. 1 shows a luminance distribution in a light emitting region between electrodes.
Figure 2A:
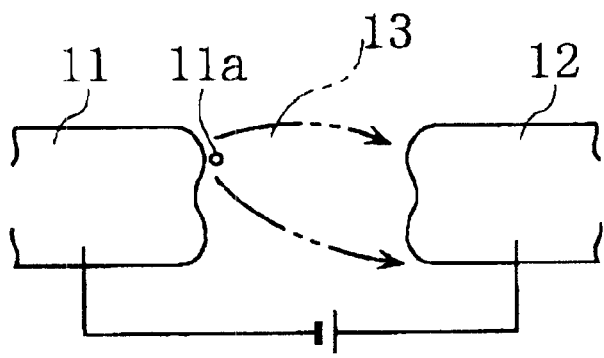
FIGS. 2A to 2D show a mechanism of wandering of a cathode luminescent spot.
Figure 2B:
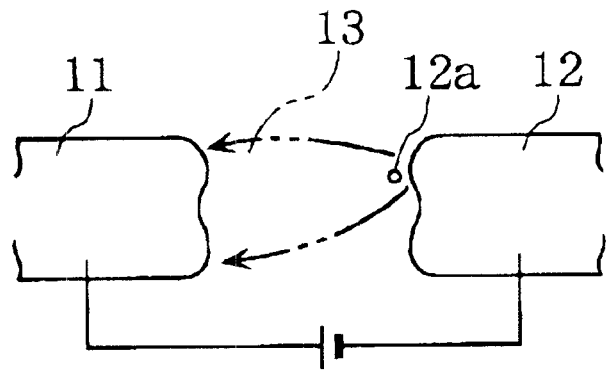
Figure 2C:
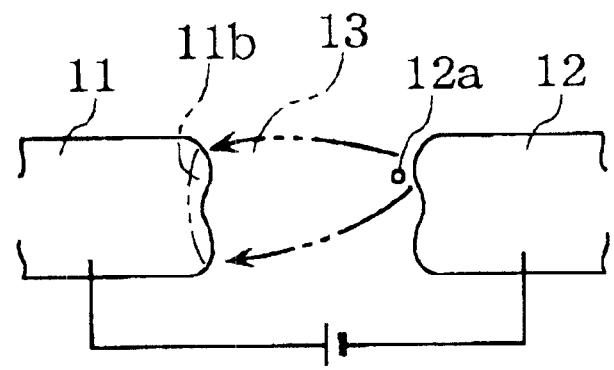
Figure 2D:
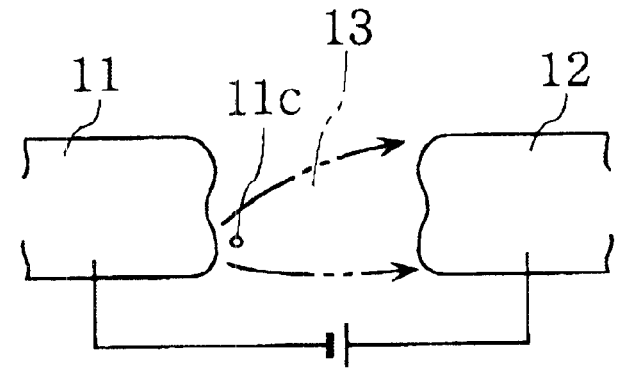

First, the description details an image projector comprising a high-pressure mercury vapor discharge lamp. The image projector comprises a lamp unit 23 that comprises a high-pressure mercury vapor discharge lamp 21 and a parabolic mirror 22. To the high-pressure mercury vapor discharge lamp 21, an alternating voltage having a predetermined frequency is applied by a driving system 24 having a function as a ballast. The discussion concerning the alternating voltage having a predetermined frequency will be detailed later. On a path of the light coming out from the light unit 23, there are provided a UV filter 25 for compensating a color temperature of the light emitted from the high-pressure mercury vapor discharge lamp 21, and a reflecting mirror 26. The light coming out from the reflecting mirror 26 is separated by dichroic mirrors 27 and 28 into three monochromatic light rays with the three primary colors RGB. Thereafter, with the aid of reflecting mirrors 29–31, the light rays enter liquid crystal panels 32–34 so as to be intensity-modulated. The intensity-modulated light rays are synthesized by a dichroic prism 35, and projected on to a screen 37 through a projection lens 36. In place of the liquid crystal panels 32–34, other intensity-modulating devices such as DMD may be employed.

Figure 4:
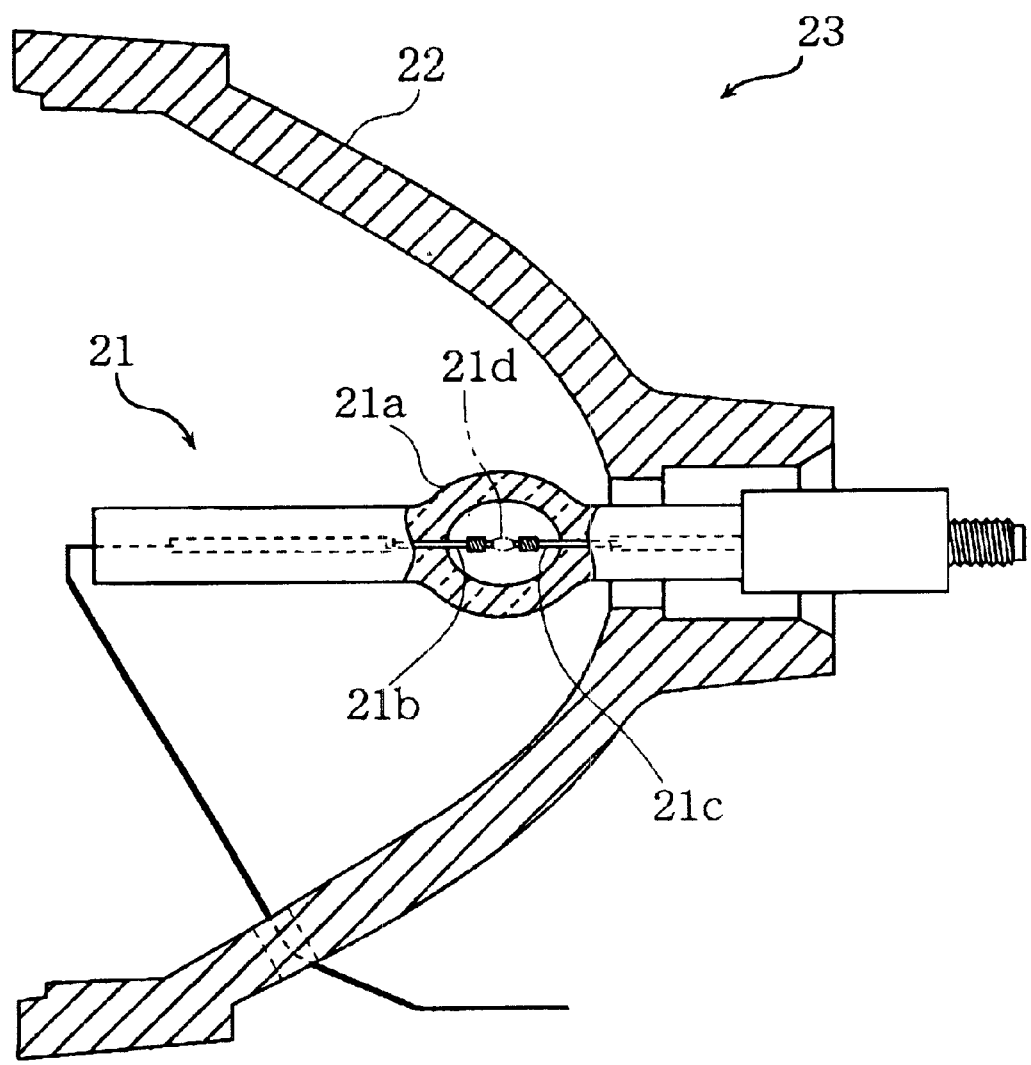
FIG. 4 is a cross-sectional view showing a construction of a high-pressure mercury vapor discharge lamp in accordance with the present invention.

As shown in FIG. 4, the high-pressure mercury vapor discharge lamp 21 in the lamp unit 23 comprises in an arc tube 21a a pair of discharge electrodes 21b and 21c that are composed of tungsten and shaped in a coil-like shape or a rod-like shape. Also in the high-pressure mercury vapor discharge lamp 21, fill materials such as mercury and a rare gas (not shown in the figure) are enclosed. It is noted that other fill materials, for example such materials as halogen gases, non-metal halides such as methyl bromide, and metal halides such as mercury bromide, may also be enclosed as a fill material. The high-pressure mercury vapor discharge lamp 21 is so disposed that a light emitting region 21d formed between the discharge electrodes 21b and 21c is located at the focal point of the parabolic mirror 22, and that most of the emitted light results in such a light that is approximately parallel to the optical axis of the parabolic mirror 22. More specifically, if the light emitting region 21d is an ideal point source, the light coming out from the parabolic mirror results in a perfect collimated light. However, the light emitting region 21d has a certain size (finite volume), and therefore a light coming out around the focal point of the parabolic mirror 22 results in a light slightly different from a collimated light. In view of this, the projection optical system including the projection lens 36 is so designed that the light emitted from the light emitting region 21d is projected on the screen 37 as much as possible, even when the light is a light slightly different from a collimated light.

Now, the description details wandering of a cathode luminescent spot and variation of a screen illuminance in the high-pressure mercury vapor discharge lamp 21, in relation to a frequency of a power source for driving the high-pressure mercury vapor discharge lamp 21.

Figure 5:
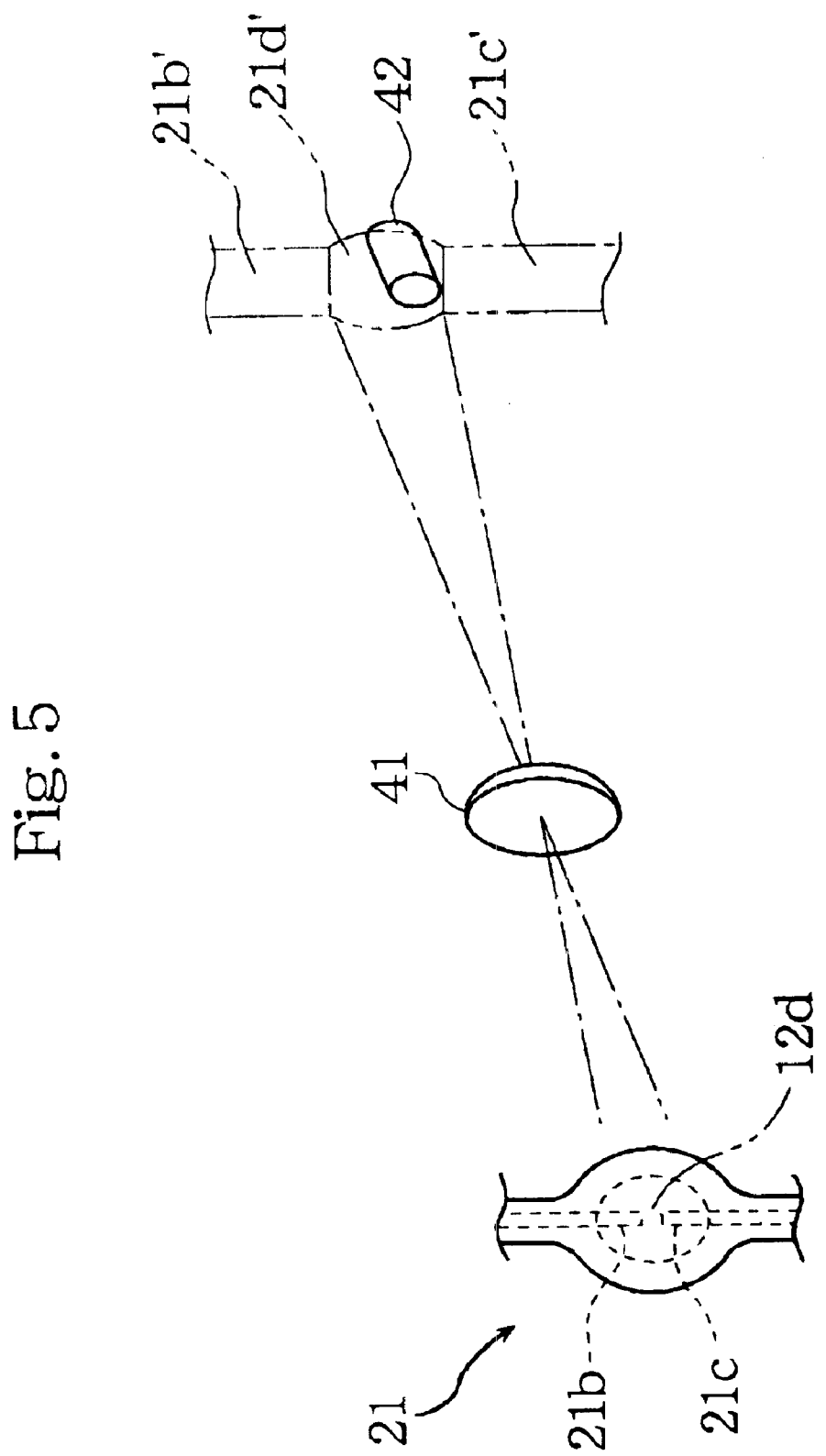
FIG. 5 shows a construction of an apparatus for measuring an illuminance variation caused by the wandering of the luminescent spot.

First, an apparatus as shown in FIG. 5 was prepared in order to measure a variation of a screen illuminance. In the apparatus, with the use of a focusing lens 41, the discharge electrodes 21b and 21c and the light emitting region 21d are enlarged, and an illuminometer 42 is placed at a position at which images 21b', 21c', and 21d', each being an image of the discharge electrodes 21b and 21c and the light emitting region 21d respectively, are formed. The lamp employed here as a high-pressure mercury vapor discharge lamp 21 has a rated power of 150 W, an arc length (distance between the electrodes) of 1.5 mm (thus, rated power/arc length=100 W/mm), and a diameter of the discharge electrodes 21b and 21c is 1.2 mm. The illuminometer 42 has a light receiving part having a diameter of 10 mm, which is approximately the same size as the enlarged image of the cathode luminescent spot. In this apparatus, when a cathode luminescent spot moves, an indicated value on the illuminometer changes accordingly. Thus, by observing the change of the indicated value, a degree of wandering of a cathode luminescent spot can be measured. It is noted that, although an illuminance at a position of the illuminometer 42 is measured here, this is in effect the same as the measurement of a luminance in the vicinity of the discharge electrodes 21b and 21c.

Figure 6:
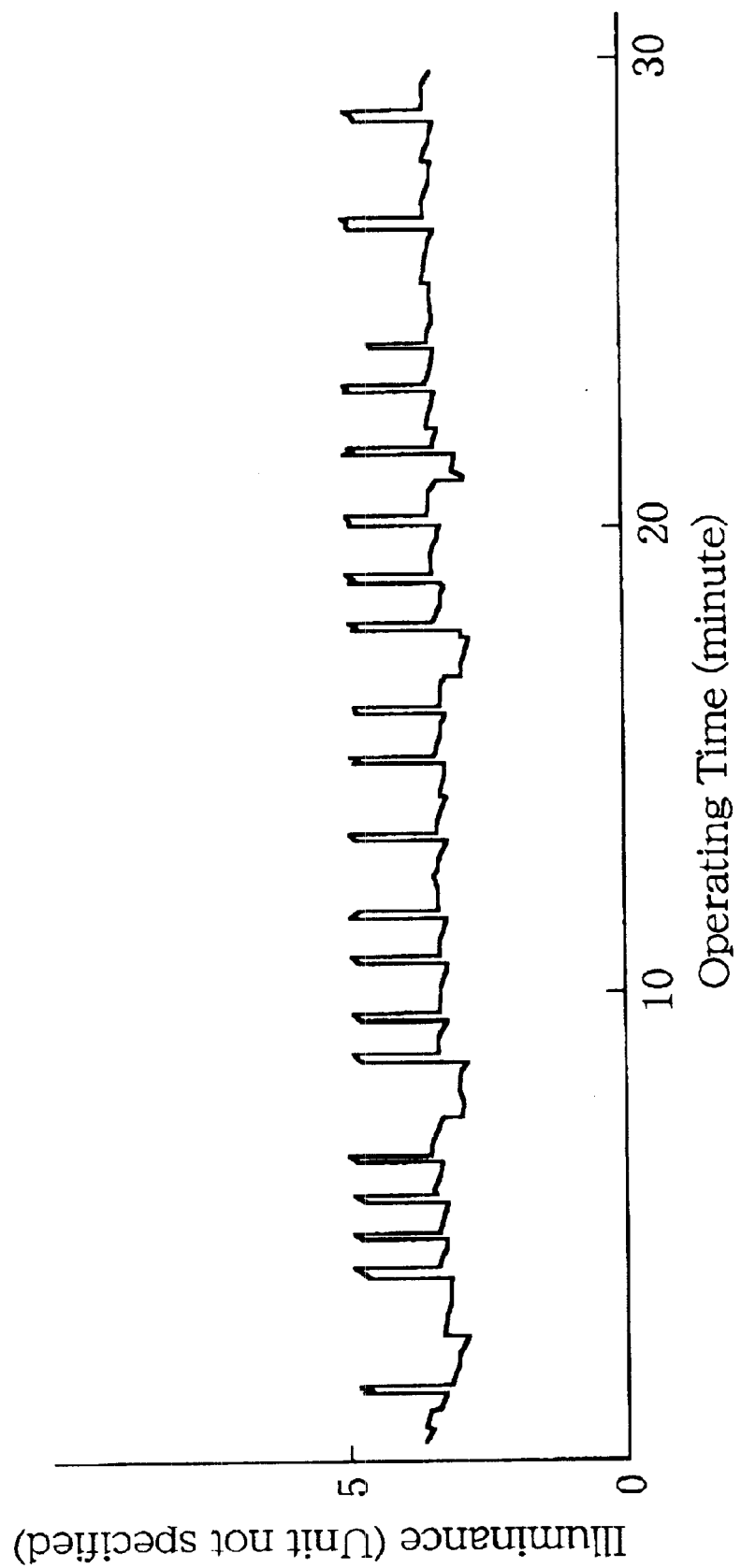
FIG. 6 is a graph showing an illuminance variation in the case where the wandering of the luminescent spot occurs.

Using the above-described apparatus, an illuminance of the high-pressure mercury vapor discharge lamp 21 was measured with operating the lamp by applying a rectangular wave voltage with a frequency of 270 Hz. The result is shown in FIG. 6. As seen from the figure that an illuminance variation, a state in which an illuminance is varied with reference to an immediately preceding illuminance, occurred about 40 times within approximately 30 minutes (the occurrences of the illuminance increase and decrease were each counted). These illuminance variations were caused by the wandering of a cathode luminescent spot.

Figure 7:
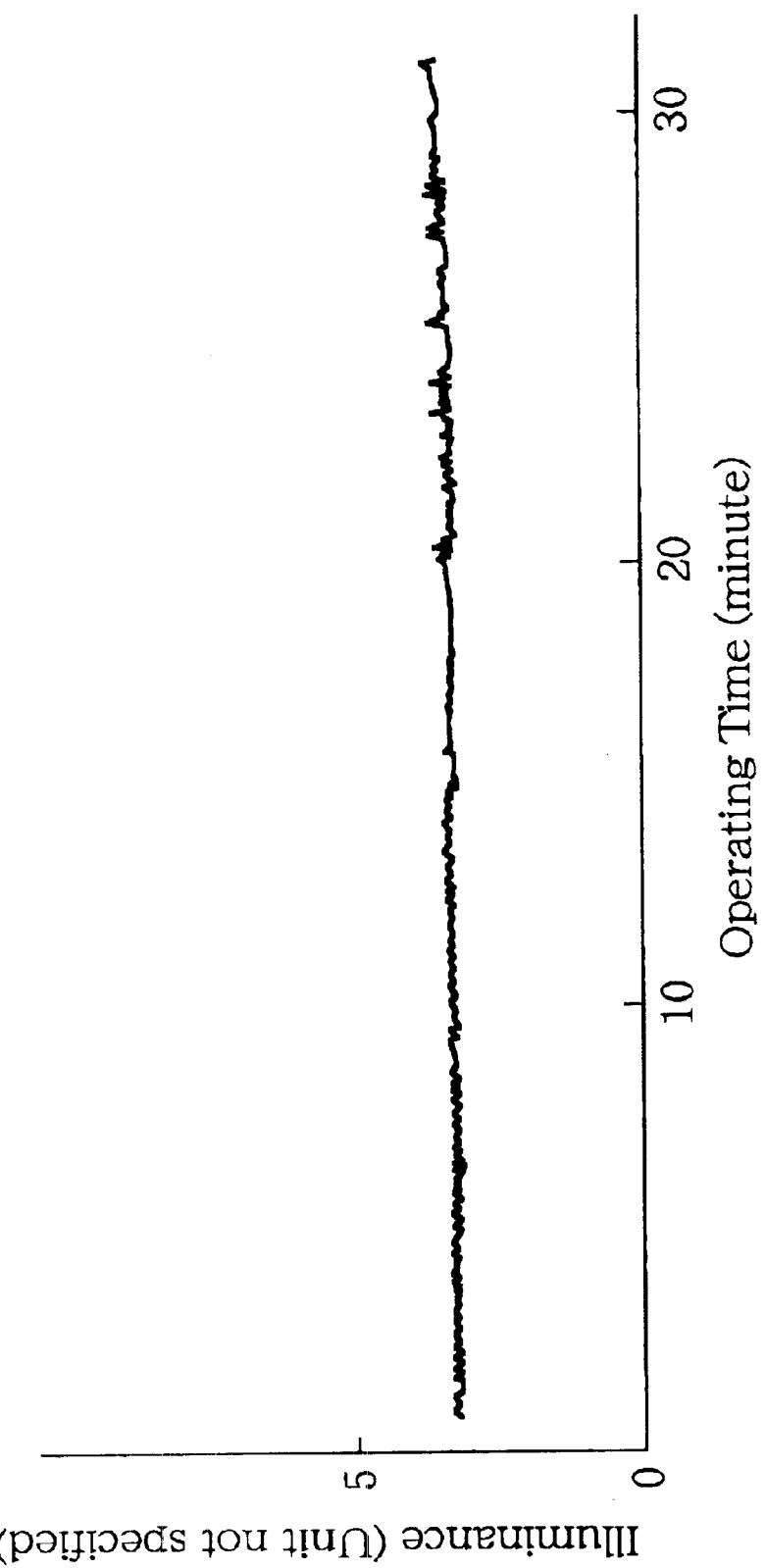
FIG. 7 a graph showing an illuminance variation in the case where the wandering of the luminescent spot is suppressed.
Figure 8:
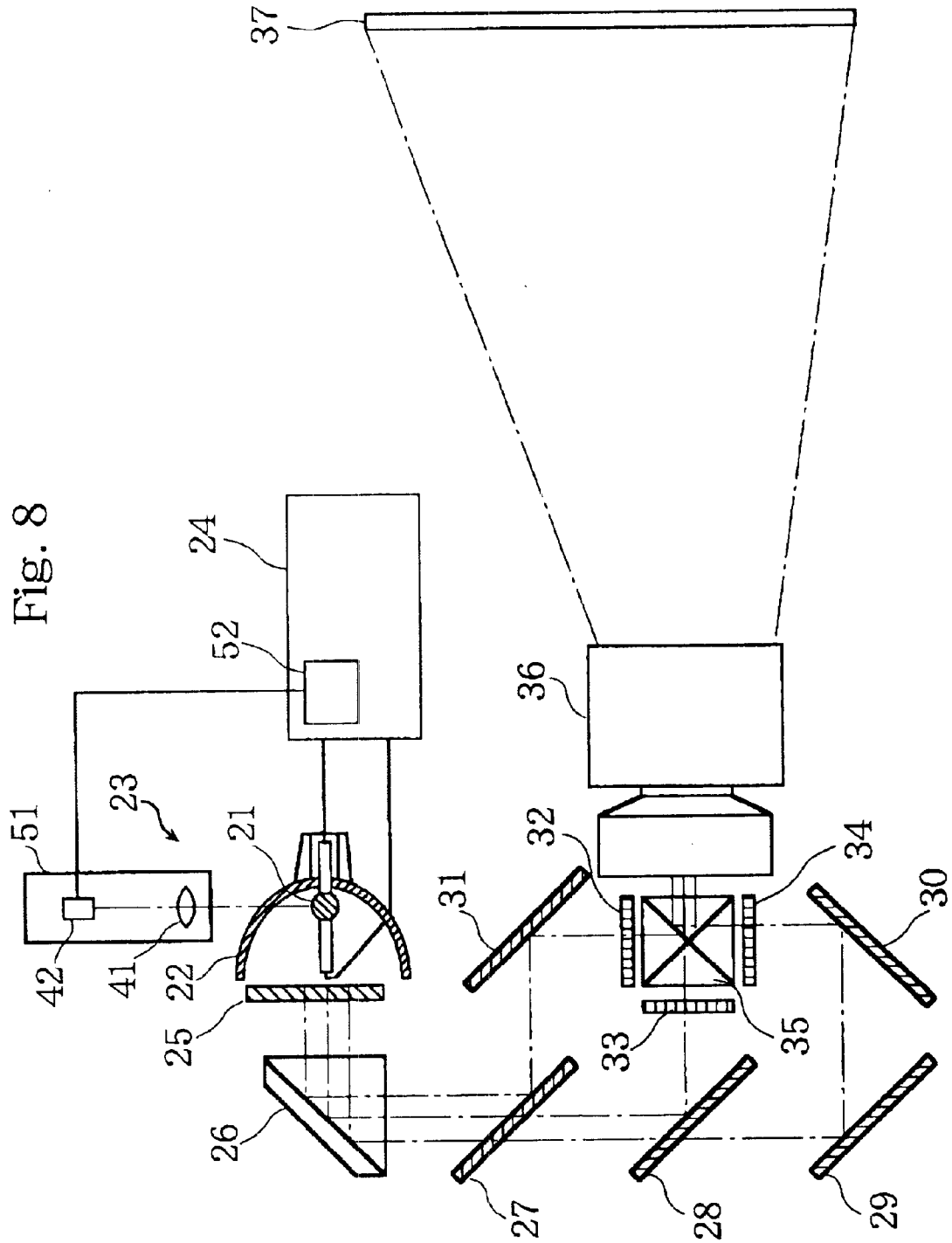
FIG. 8 shows a construction of another image projector according to the present invention.

By contrast, as shown in FIG. 7, when a sine wave with a frequency of 29 kHz was applied to the high-pressure mercury vapor discharge lamp 21 to operate the lamp, such illuminance variation, i.e., wandering of a cathode luminescent spot was not observed.

Figure 3:
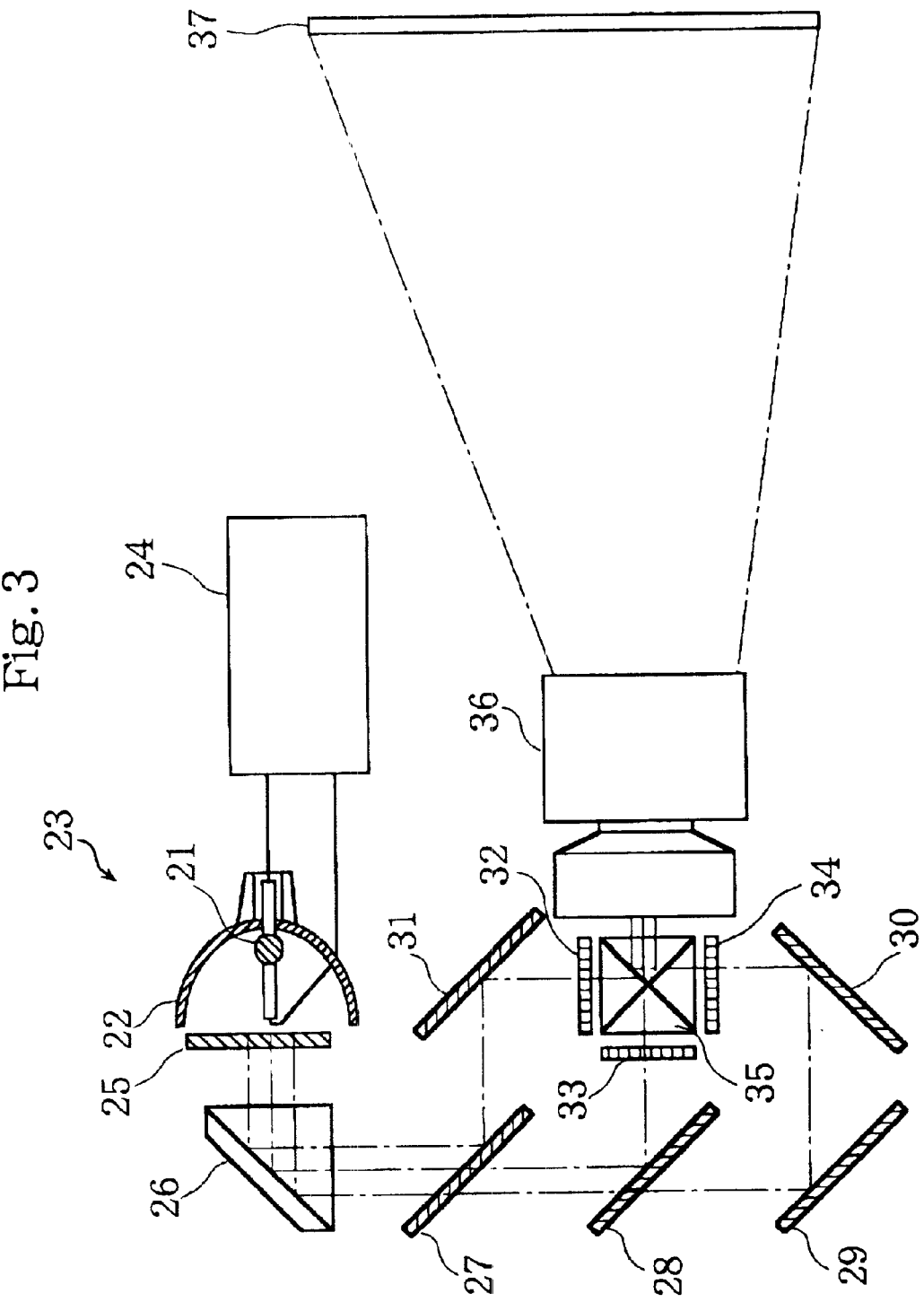
FIG. 3 shows a construction of an image projector in accordance with the present invention.

In addition, the same voltages (a rectangular wave of 270 Hz and a sine wave of 29 kHz) were applied to the high-pressure mercury vapor discharge lamp 21 provided in the image projector of FIG. 3, and the screen 37 was observed. As a result, visible flicker was observed only in the case of the rectangular wave of 270 Hz. Further, using various frequencies and waveforms, the relationship between an observer's perception of flicker in the projected image and a size and frequency of occurrence of the illuminance variation was examined. As a consequence, it was found that when the size of the illuminance variation exceeds ±5% of the immediately preceding illuminance and the frequency of occurrence of the illumination variation is approximately less than 60 times/second, a viewer tends to perceive the illumination variation as flicker, and thus image quality degradation becomes apparent.

In addition, the same measurement was performed for 3 minutes using lamps having the same specification as the foregoing lamp except that the arc length was 1.7 mm and 1.8 mm respectively (rated power/arc length≈88 W/mm or 83 W/mm, respectively) with applying sine wave voltages of various power source frequencies. The result is shown in Table 1 below.

TABLE 1

| Lamp No. | 1 | 2 | 3 |
| --- | --- | --- | --- |
| Rated Power (W) | 150 | 150 | 150 |
| Arc Length (mm) | 1.5 | 1.7 | 1.8 |
| Rated Power/Arc Length (W/mm) | 100 | 88.2 | 83.3 |
| Frequency (kHz) | | | |
| 20 | x | x | x |
| 21 | ○ | x | ○ |
| 22 | ○ | x | x |
| 23 | ○ | ○ | ○ |
| 24 | ○ | ○ | ○ |
| 25 | ○ | ○ | ○ |
| 26 | x | x | ○ |
| 27 | x | x | ○ |
| 28 | ○ | ○ | ○ |
| 29 | ○ | ○ | ○ |
| 30 | ○ | ○ | ○ |
| 31 | ○ | ○ | ○ |
| 32 | x | ○ | ○ |
| 33 | ○ | ○ | ○ |
| 34 | ○ | ○ | ○ |
| 35 | ○ | ○ | ○ |
| 36 | x | ○ | ○ |
| 37 | ○ | x | ○ |
| 38 | ○ | x | x |
| 39 | ○ | ○ | x |
| 40 | x | x | x |
| 41 | x | x | x |
| 42 | x | x | x |

Note:
○ denotes that no wandering of a cathode luminescent spot occurred.
x denotes that wandering of a cathode luminescent spot occurred.

In Table 1, the symbol ○ denotes that no wandering of a cathode luminescent spot occurred (either a size of the illuminance variation was ±5% or less, or a frequency of occurrence of the illuminance variation was 60 times/second or more), and x denotes that the wandering of a cathode luminescent spot occurred (both a size of the illuminance variation was more than ±5% or more, and a frequency of occurrence of the illuminance variation was less than 60 times/second). From the above Table 1, it is seen that there is a frequency band in which substantially no wandering of a cathode luminescent spot occurs in the range of a power source frequency being 20 kHz to 42 kHz. Moreover, with a power source frequency of around 30 kHz, no wandering of a cathode luminescent spot was observed in the lamps of any arc lengths. Accordingly, it is understood that by selecting one of the frequencies in the foregoing range, wandering of a cathode luminescent spot can be suppressed, and flicker in the projected image can be prevented. In particular, in the case where a temperature of the tip of each of the discharge electrodes 21b and 21c becomes 3000 K or higher, wandering of a cathode luminescent spot is more likely to occur, and therefore, the advantageous effect of preventing flicker by selecting the foregoing power source frequency range is remarkable.

Similar results were obtained by using rectangular wave voltages as well. However, the use of sine wave voltages was more effective in suppressing the wandering of a cathode luminescent spot. In addition, although the foregoing example details a case in which a threshold value of illuminance variation is ±5%, selecting other frequencies is also possible as long as flicker in the projected image does not cause a substantial problem depending on conditions such as a combination of the components of the projection optical system in the image projector and the like, even if the size of illuminance variation is ±5% or more. Furthermore, the specification of the high-pressure mercury vapor discharge lamp is not limited to that of the above-described lamp, and by appropriately selecting a power source frequency, the same advantageous effect can be achieved. Particularly in the case where rated power/arc length≧80 W/mm and in the case where the arc length (distance between the electrodes) is 3 mm or shorter, the advantageous effect of preventing flicker in the projected image is ensured.

Now, the description details another example of an image projector according to the invention. The image projector has the same construction as the foregoing image projector of FIG. 3 except that it comprises a detector 51 for detecting wandering of a cathode luminescent spot, and that the driving system 24 comprises a frequency controller 52 for controlling (adjusting) a frequency of an applied voltage to the high-pressure mercury vapor discharge lamp 21. The detector 51 comprises a focusing lens 41 and an illuminometer 42, as in the apparatus of FIG. 5, and measures an illuminance of a light coming through a reflection plane of the parabolic mirror 22. The frequency controller 52 controls a frequency of the voltage outputted from the driving system 24 in response to the result of the measurement by the detector 51, so that wandering of a cathode luminescent spot is suppressed. Specifically, for example, the frequency controller 52 successively changes the frequency within the range of 20 kHz to 42 kHz to search a frequency at which no or little illuminance variation is caused. Having such a configuration, the image projector can suppress wandering of a cathode luminescent spot and thereby prevent flicker in the projected image, even if the high-pressure mercury vapor discharge lamp 21 has a variation in the characteristics or produce a variation due to aging.

The illuminometer 42 is not limited to the above-described example in which the illuminance of a leaked light coming through the reflection plane of the parabolic mirror 22 is measured, but may be such an illuminometer that an illuminance of an emitted light coming out of the parabolic mirror 22 is measured, or may be such an illuminometer that an illuminance on the screen 37 is measured. In addition, it is also possible to eliminate the detector 51 and instead to provide a means for manually adjusting the frequency of the voltage outputted from the driving system 24.

Although the present invention and its advantages have been described in detail with respect to preferred embodiments thereof, it should be understood that various changes, modifications, and alterations can be made herein without departing from the spirit and scope of the invention as defined by the appended claims.

What is claimed is:

1. A method for driving a high-pressure mercury vapor discharge lamp comprising in an arc tube a pair of discharge electrodes opposed to each other, said lamp wherein at least mercury and a rare gas are enclosed in the arc tube, comprising:

applying an alternating voltage between the discharge electrodes, said alternating voltage having a frequency within the range of 21 kHz to 39 kHz such that wandering of a cathode luminescent spot generated in the vicinity of a tip of each of the discharge electrodes is suppressed; and wherein said high-pressure mercury vapor discharge lamp has a mercury vapor pressure of 200 atm or higher during lamp operation and an arc length of 3 mm or less.

2. The method for driving a high-pressure mercury vapor discharge lamp according to claim 1, wherein:

said high-pressure mercury vapor discharge lamp has an arc length and a rated power such that $P/d \geq 80$ (W/mm), where d is the arc length (mm) and P is the rated power (W).

3. The method for driving a high-pressure mercury vapor discharge lamp according to claim 1, wherein said arc length is 1.8 mm or less.

4. A driving system for a high-pressure mercury vapor discharge lamp comprising in an arc tube a pair of electrodes opposed to each other, said lamp wherein at least mercury and a rare gas are enclosed in the arc tube, said driving system operating said lamp by applying an alternating voltage between the discharge electrodes, wherein:

said high-pressure mercury vapor discharge lamp has a mercury vapor pressure of 200 atm or higher during lamp operation and an arc length of 3 mm or less; and a frequency of said alternating voltage is within the range of 21 kHz to 39 kHz, whereby wandering of a cathode luminescent spot generated in the vicinity of a tip of each of the discharge electrodes is suppressed.

5. The driving system for a high-pressure mercury vapor discharge lamp according to claim 4, wherein:

said high-pressure mercury vapor discharge lamp has an arc length and a rated power such that $P/d \geq 80$ (W/mm), where d is the arc length (mm) and P is the rated power (W).

6. The driving system for a high-pressure mercury vapor discharge lamp according to claim 4, wherein said frequency of the alternating voltage is such that, when an image of an arc adjacent to a tip of at least one of the discharge electrodes is projected onto a predetermined projection plane, the variation of illuminance on said projection plane is ±5% or smaller.

7. The driving system for a high-pressure mercury vapor discharge lamp according to claim 4, wherein the temperature of a tip of each of the discharge electrodes is 3000 K or higher in said high-pressure mercury vapor discharge lamp being operated.

8. The driving system for a high-pressure mercury vapor discharge lamp according to claim 4, further comprising:

means for adjusting said frequency of the alternating voltage.

9. The driving system for a high-pressure mercury vapor discharge lamp according to claim 8 further comprising:

means for detecting a luminance in the vicinity of a tip of at least one of the discharge electrodes, said driving system wherein:

said means for adjusting said frequency of the alternating voltage controls said frequency of the alternating voltage to be a frequency such that wandering of a cathode luminescent spot generated in the vicinity of a tip of each of the discharge electrodes is suppressed, in response to a result detected by said means for detecting.

10. The driving system for a high-pressure mercury vapor discharge lamp according to claim 4, wherein said arc length is 1.8 mm or less.

* * * * *